Nov. 21, 1961  P. T. HAHN  3,009,197
CRIMPING AND INJECTION MOLDING
Filed Nov. 5, 1958  7 Sheets-Sheet 3
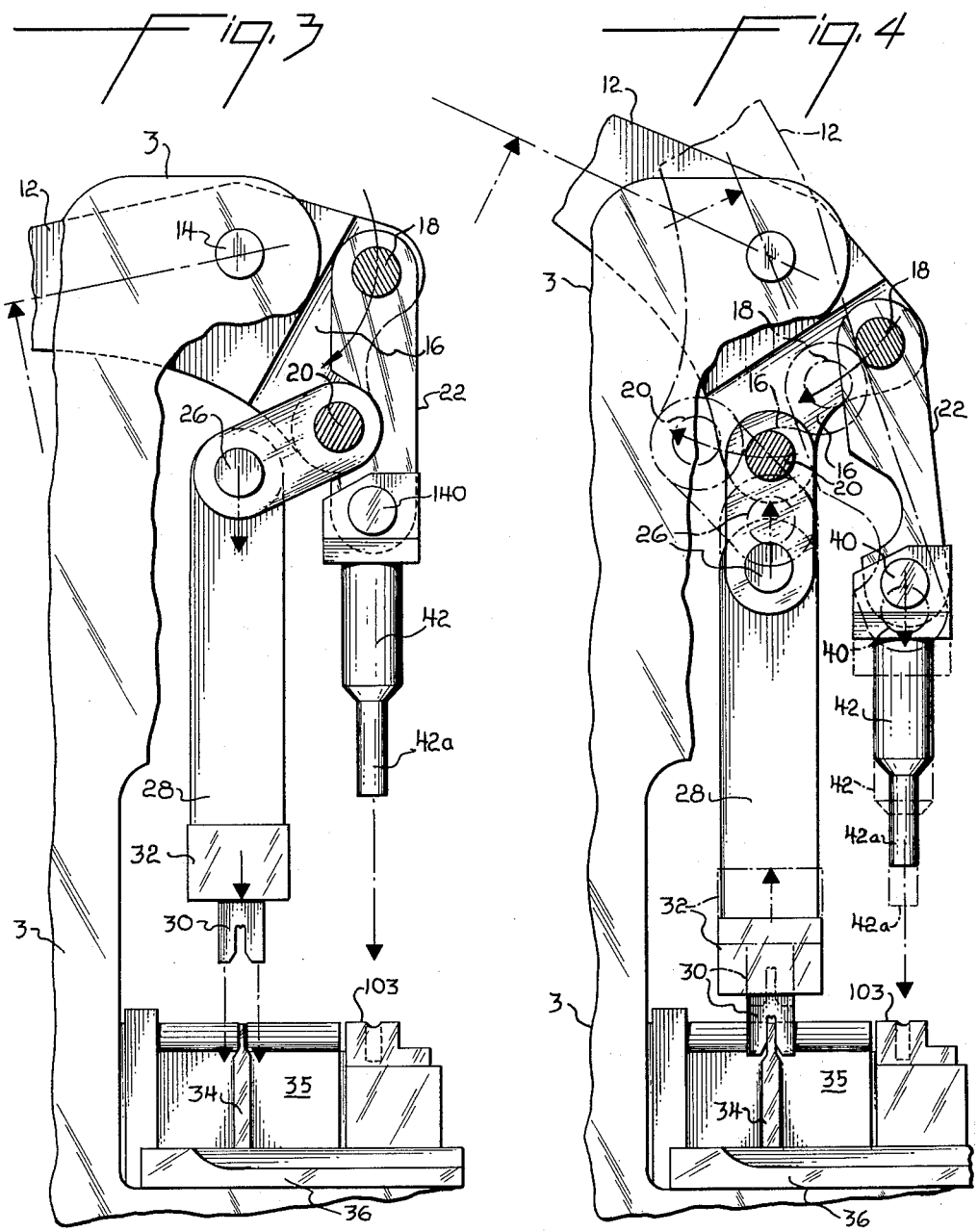
INVENTOR.
PAUL T. HAHN
BY
Curtis, Morris & Safford

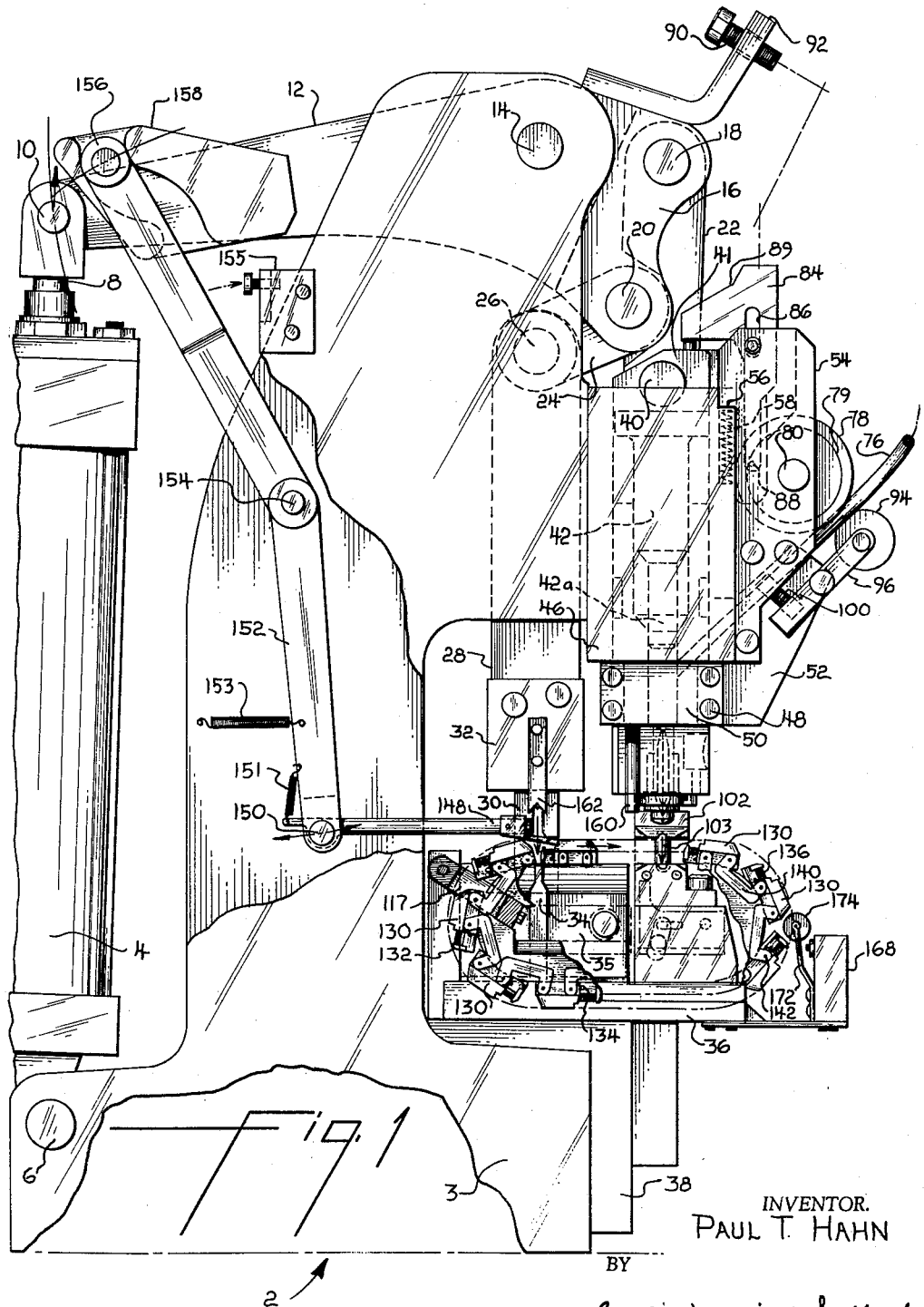

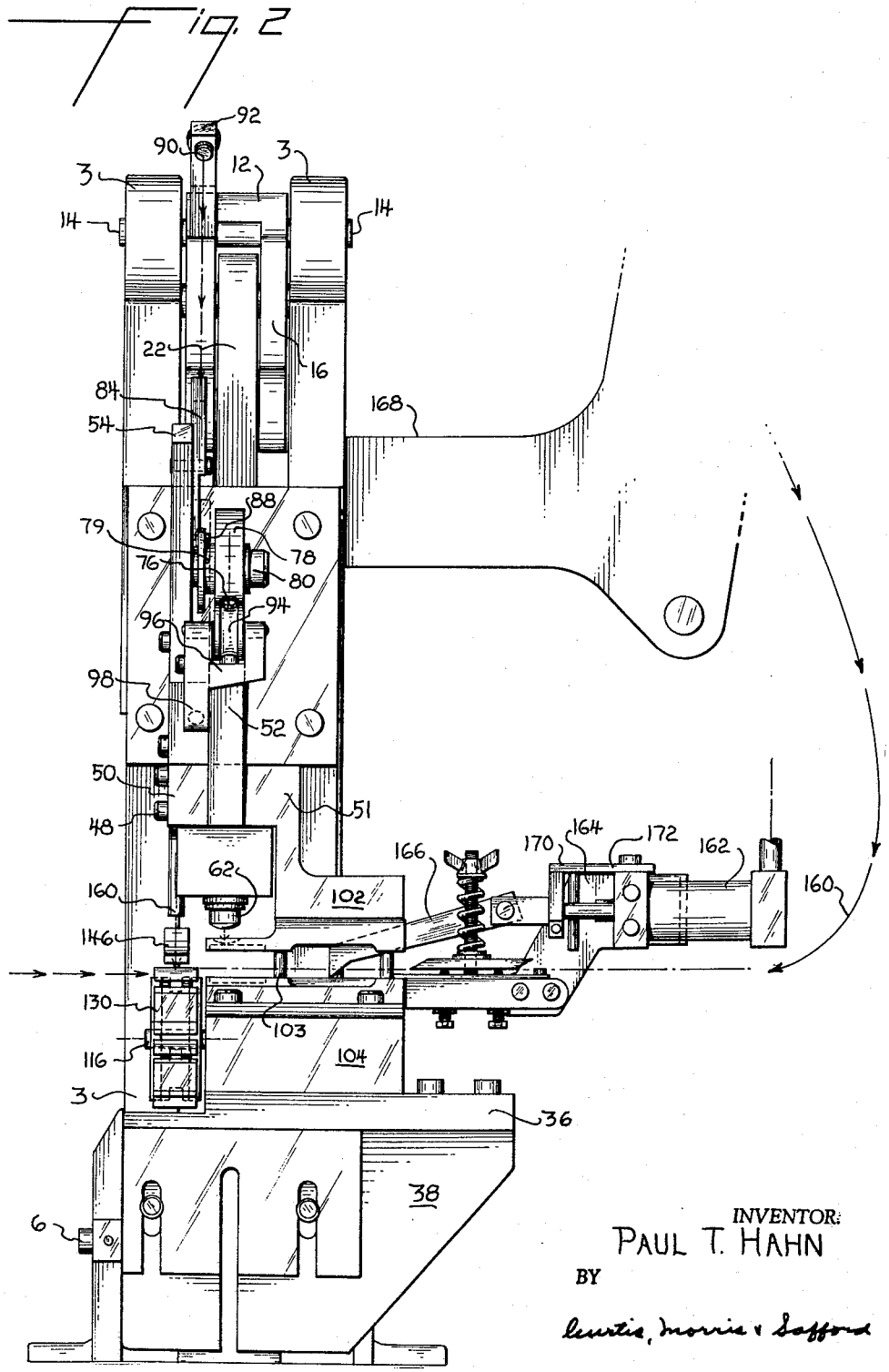

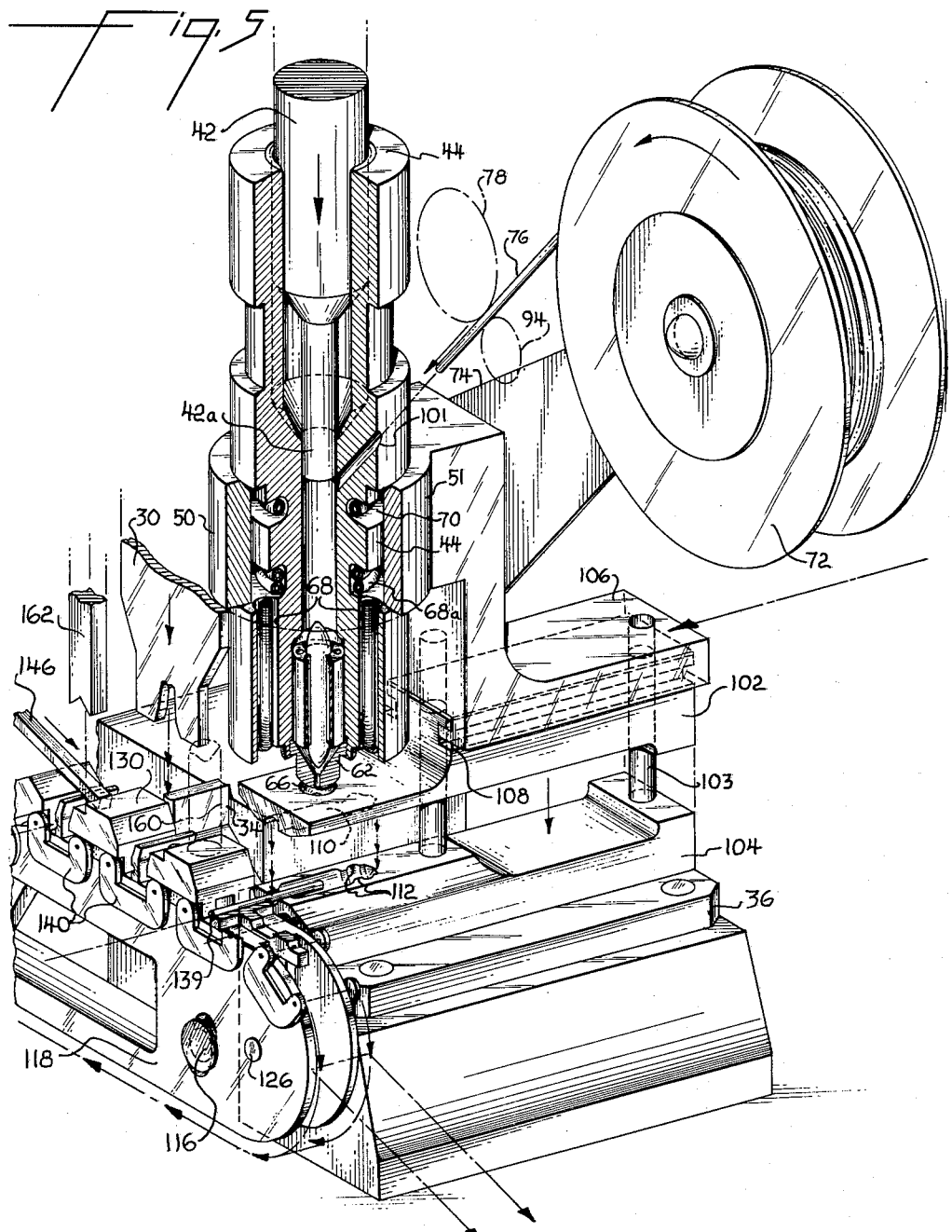

Nov. 21, 1961 P. T. HAHN 3,009,197
CRIMPING AND INJECTION MOLDING
Filed Nov. 5, 1958 7 Sheets-Sheet 5
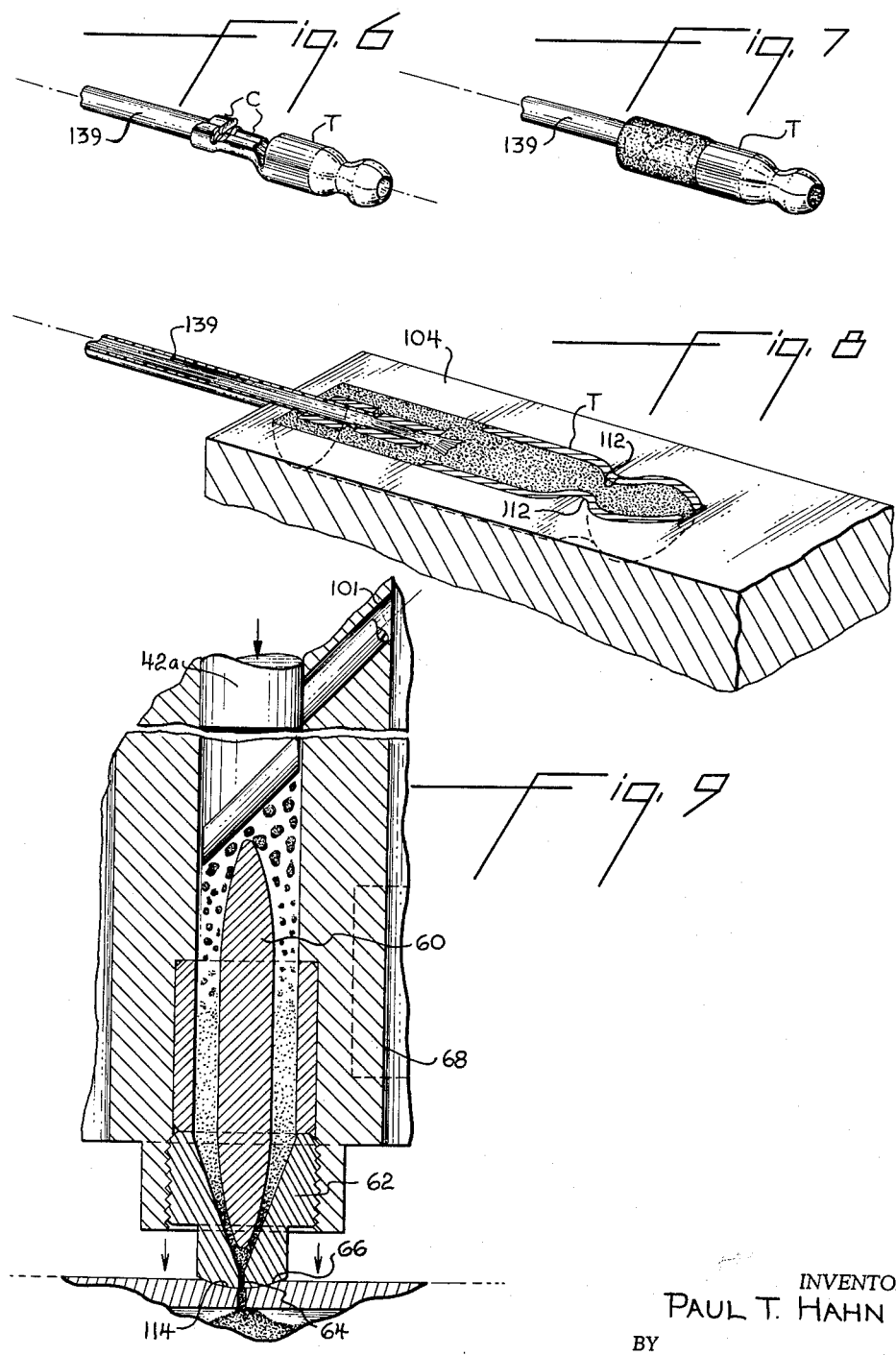
INVENTOR.
PAUL T. HAHN
BY
Curtis, Morris & Safford

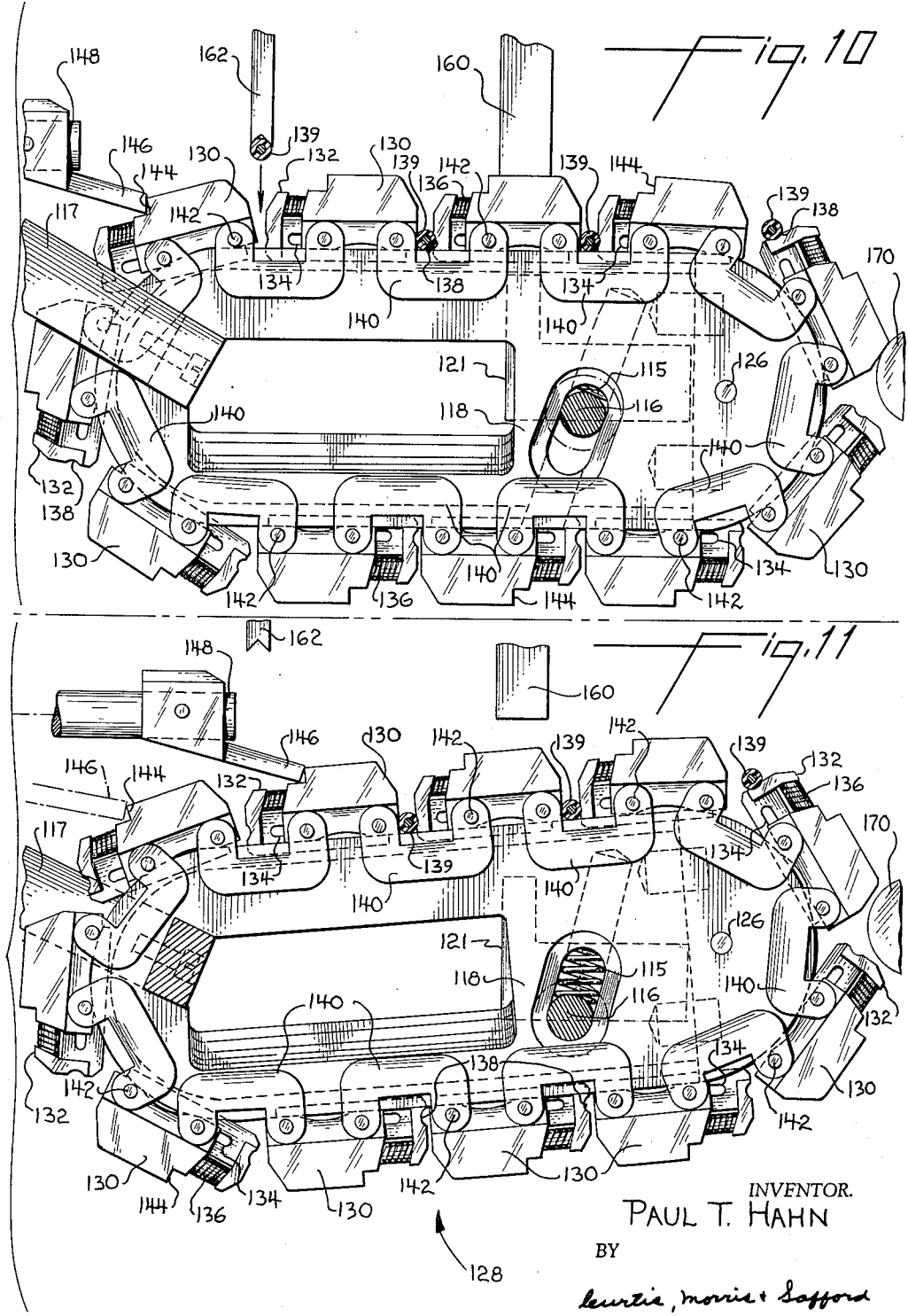

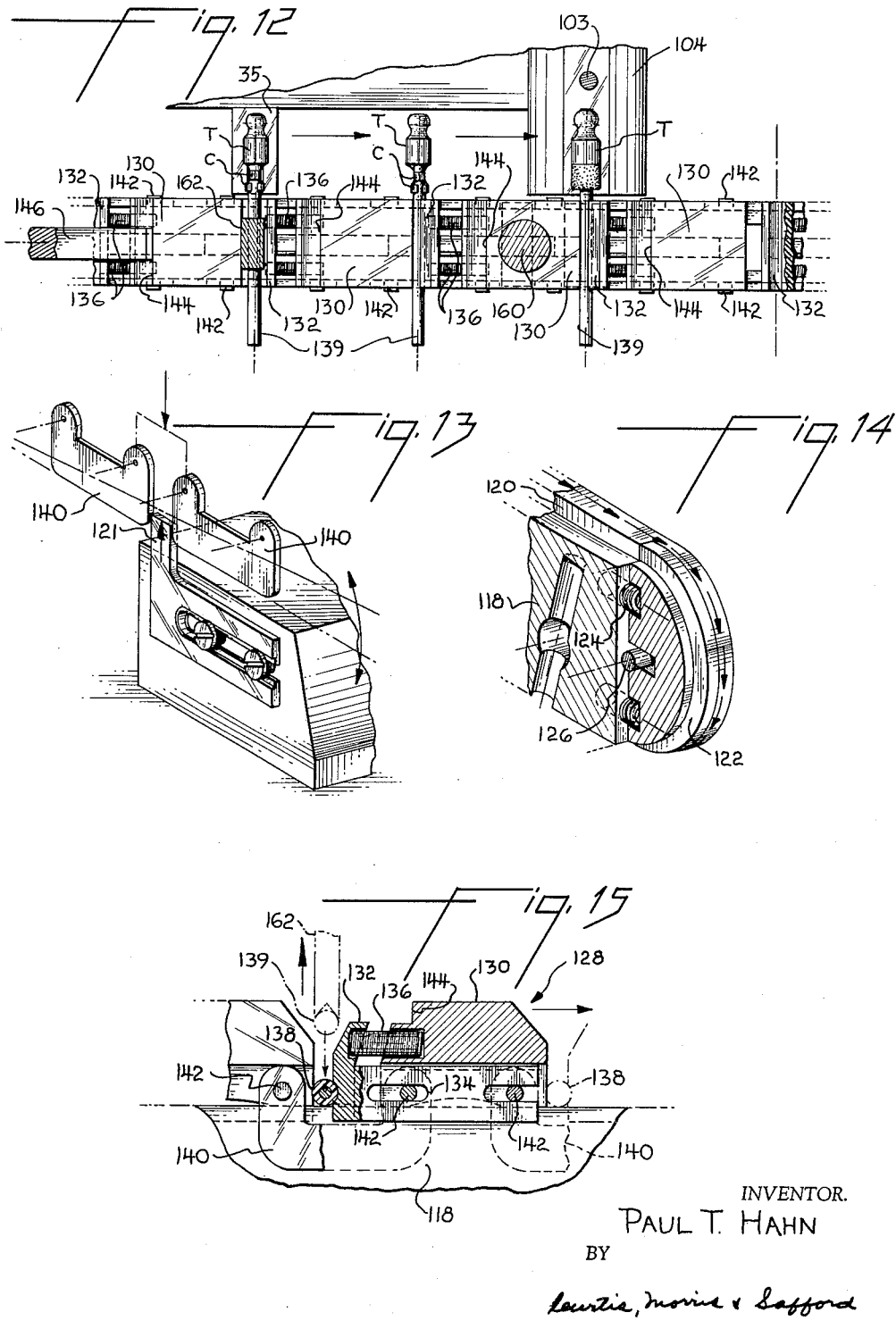

United States Patent Office 3,009,197
Patented Nov. 21, 1961

3,009,197
CRIMPING AND INJECTION MOLDING
Paul T. Hahn, Harrisburg, Pa., assignor to
AMP Incorporated, Harrisburg, Pa.
Filed Nov. 5, 1958, Ser. No. 772,007
10 Claims. (Cl. 18—5)

This invention relates to presses, particularly but not necessarily exclusively, to presses adapted to apply a terminal to a wire and mold plastic insulating material around portions of the terminal.

One of the objects of the invention is to provide an improved press having two rams which are actuated by a single source of power such as a pneumatic cylinder. A further object is to provide a press having two rams and having a transfer means for transferring the work from a position adjacent the first ram to a position adjacent the second ram. A further object is to provide an apparatus which is capable of automatically or semi-automatically crimping a terminal onto a wire end and molding insulating material around portions of the terminal. A still further object of the invention is to provide an improved injection molding apparatus in which the mold parts are closed by the injector and the plastic which is forced into the molding cavity.

These and other objects of the invention are achieved in a preferred embodiment comprising a lever pivotally mounted intermediate its ends and having a pair of links pivotally secured thereto adjacent one end on separate pivotal axes. Each of the links in turn is pivotally secured to a ram in a manner such that when the lever is rocked or oscillated through a complete cycle (first in one direction and then in the opposite direction), one of the rams goes through its bottom dead center position twice while the second one of the rams approaches its bottom dead center position and then retracts from its bottom dead center position. The first ram carries on its end a crimping die for crimping a terminal onto a wire end while the second ram carries an injection molding plunger for molding insulating plastic around a terminal. Also provided is a transfer mechanism which automatically transfers a wire from a position adjacent the first ram to a position adjacent the second ram. Thus, during a complete operating cycle of the apparatus, a terminal is crimped onto a wire end and at the same time, plastic insulating material is molded around a crimped terminal on a wire end, and the transfer mechanism is indexed to move the crimped but uninsulated terminal towards the molding station while the insulated terminal is discharged from the transfer mechanism.

In the drawings;

FIGURE 1 is a side view of a preferred embodiment of the invention;

FIGURE 2 is a frontal view of the apparatus of FIGURE 1;

FIGURES 3 and 4 are fragmentary views showing the actuating linkage of the apparatus and illustrating the operation of the rams;

FIGURE 5 is a fragmentary perspective view on an enlarged scale and with parts broken away showing the mold, the injector ram and the transfer mechanism;

FIGURES 6 and 7 are perspective views of a terminal on a wire end, FIGURE 6 showing the crimped terminal before the molding operation and FIGURE 7 showing the terminal after the insulation has been molded therearound;

FIGURE 8 is a fragmentary perspective view of the lower portion of the mold;

FIGURE 9 is a sectional view showing the molding injector nozzle and its associated structure;

FIGURES 10 and 11 are frontal views of the transfer mechanism illustrating the transfer cycle; and FIGURES 12, 13, 14 and 15 are fragmentary views of portions of the transfer mechanism.

Referring first to FIGURES 1 and 2, a press 2 in accordance with the invention comprises a pair of substantially C-shaped side plates 3 between which a double acting piston-cylinder 4 is pivotally mounted at 6 at the rearward end thereof. The piston rod 8 from this piston cylinder has a clevis on its end by means of which it is pivotally connected at 10 to a lever 12 which lever is pivotally mounted intermediate its ends on a shaft 14 which extends between side plates 3 at the upper ends thereof. The opposite end of lever 12 is bifurcated as shown at 16 and accommodates a pair of pins 18, 20 by means of which this end of the lever is secured to links 22, 24. Link 24 has a pivotal connection 26 with a ram 28 reciprocable in guideways contained between the opposed sides 3. On its lower end ram 28 has secured thereto crimping die means 30 by means of a suitable clamping plate and spacers generally indicated at 32. These crimping dies cooperate with a lower crimping die or anvil 34 to crimp a terminal onto a wire end, this lower anvil being secured by means of a clamping plate 35 to a base plate 36 which in turn is supported in a pedestal 38 contained between side plates 3.

It will be apparent from FIGURES 3 and 4 that as lever 12 is rocked in a clockwise direction about its pivotal axis 14, ram 28 first descends, reaches its bottom dead center position when the axes 26, 20 and 14 are in alignment, and then ascends as this bottom dead center position is passed. When the lever 12 is rocked in the opposite or counterclockwise direction, ram 28 again passes through its bottom dead center position and ascends to assume the position of FIGURE 1.

Link 22, the other one of the links secured to the end of lever 16, is pivotally connected at 40 to a clevis 41 on a ram 42 having a reduced diameter end 42a. This ram functions as a molding injection plunger and for this purpose it is reciprocable within a cylindrical member 44 (FIGURE 5) having an axial bore which is of reduced diameter at the lower end to accept the reduced diameter portion 42a of the plunger. Cylinder 44 is slidably mounted within a cylindrical bore in a housing 46 which in turn is secured to side plates 3 as shown in FIGURE 2. The lower end of the cylinder 44 projects below the housing and has clamped thereto by means of bolts 48 a pair of collars 50, 51. These collars do not extend entirely around the circumference of the cylinder but provide a gap between which is clamped a bracket 52 which extends obliquely away from the cylinder and beyond housing 46. A plate 54, which is fastened to bracket 52, extends upwardly alongside the frontal wall of housing 46 and provides one ear 56 which projects inwardly of the housing and over a drilled hole therein. As shown in FIGURE 1, the housing 46 is slotted near the open end of this drilled hole to permit downward movement of plate 54 against the compression of a spring 58 although the plate 54 is normally biased upwardly by the spring to the position of FIGURE 1. It will thus be apparent that cylinder 44 is normally biased upwardly within housing 46 by virtue of spring 58 which acts through plate 54, bracket 52, and collars 50, 51 which are secured to the lower end of the cylinder, however, the cylinder can move downwardly within housing 46 against the compression of this spring.

The lower end of cylinder 44 is enlarged for the accommodation of a conventional spreader 60 (see FIGURE 9) to insure even distribution, heating and flow of the plastic as it is forced into the mold in the manner described below. The open lower end of the cylinder has threaded thereto a nozzle 62 having a relatively small orifice 64 and a spherical outwardly concave surface 66. Advantageously, a heating means is contained within the lower portion of the cylinder in the vicinity of the spreader in order to heat the plastic to the proper temperature for the molding operation. In the disclosed embodiment, this heating means takes the form of resistance heating elements which extend into openings 68 in cylinder 44 and which are supplied with power from any convenient source by means of leads 68a. In some instances it will be found to be desirable to provide a cooling means in the cylinder in the zone above the heated zone in order that the plastic will not be melted or softened as it is fed into the cylinder. In the disclosed embodiment such cooling means is shown in the form of water tubes 70 which extend around the cylinder intermediate its ends and through which cooling water from any convenient source may be circulated.

The plastic molding material for the molding operation is drawn from a supply reel 72 which is rotatably mounted on a bracket 74 extending from the press frame and fed through a passageway 101 into the central bore of cylinder 44. The plastic, as shown at 76, in the form of a continuous cylindrical strand or filament, is intermittently fed by means of a feed wheel 78 on an overrunning clutch 79 mounted on a pin 80 which extends from plate 54. This overrunning clutch, which is not illustrated in detail, is rotated in both directions by means of a plate 84 having a pin slot connection 86 with plate 54 and having a pinned connection 88 with the overrunning clutch. Plate 84 is moved downwardly relative to plate 54 within the limits of motion permitted by the slot 86 when a bolt 90, threaded through a bracket 92 on the end of lever 12, engages the upper end of the plate. The plate 84 is moved upwardly relative to plate 54 on the return stroke of the ram when the upper surface of clevis 41 engages a pin which extends from an inwardly directed projection 89 of the plate. During such upward movement of plate 84, the overrunning clutch causes rotation of feed wheel 80 in the clockwise direction as viewed in FIGURE 1 to effect feeding of the plastic. During downward motion of the plate 84, the feed wheel does not move by virtue of the overrunning clutch. The plastic molding material is pressed against feed wheel 78 by means of a pressure roller 94 freely rotatable on a pin in the end of a lever 96 which is pivoted intermediate its ends to bracket 52. This lever is normally biased by means of a spring 100 in a counterclockwise direction as viewed in FIGURE 1 so that the pressure roller presses the plastic strip against the feed roll.

It will be noted that when the ram end 42a is in the top dead center position, the face of this ram is above the passageway through which the plastic is fed. During descent of the ram, a previously fed section of plastic is sheared and pressed downwardly into the heating zone of the cylinder where it is softened and injected into the mold. Fresh plastic is then fed into the central bore of the cylinder during upward movement of the ram and after the ram has passed the open end of passageway 101.

The mold for the plastic comprises an upper half 102 and a lower or fixed half 104 which is mounted on plate 36. Upper mold half 102 is carried by an extension 106 on the end of collar 51 by means of grooves and flanges 108 on the mold and collar extension respectively. Mold half 102 provides an upper mold cavity 110 which in part conforms closely in shape to the leading end of the electrical terminal indicated at T in FIGURES 6 and 7 so that during the molding operation plastic is not molded over this leading contact portion of the terminal, however, the mold permits flow of the plastic into surrounding relationship with respect to the crimped portions C of the terminal and at the same time flow of the plastic into the hollow frontal portion of the terminal.

The upper or moveable section of the mold provides a spherical depression 114 which conforms to the spherical surface of nozzle 62 and this upper section is slidable on guide pins 103 which extend from the lower mold half. In use, the mold is closed when the injector plunger forces the plastic down through the spreader and towards the nozzle 62. Closure of the mold is brought about by transmission of forces from ram 42a through the plastic to cylinder 44. In part these forces are transmitted through the unmelted plastic in the cylinder base and in part through the melted plastic by virtue of the friction between the plastic and the wall of the bore. It will be appreciated that orifice 64 must be of a relatively small diameter to accomplish this closure of the mold by means of the frictional forces developed between the plastic and the cylinder.

After the mold halves have been closed, the plastic is forced downwardly into the mold cavity and flows around and into the terminal as illustrated in FIGURES 6 and 7. Advantageously, the press is arranged in such manner that injector ram 42, 42a does not ordinarily reach its bottom dead center position although it may approach closely to this position as shown in the broken line position of FIGURE 4. With this arrangement, the plastic is always being forced downwardly and into the mold cavity during the molding operation and the injection pressure developed by the plunger is not relieved until lever 12 begins to rock in the counterclockwise direction.

The transfer mechanism or conveyor for transferring the wires from the crimping station to the injection molding station comprises a plate 118 which is mounted on the end of a bar 117 which in turn is pivoted to a bracket extending from pedestal 38 so as to permit the plate to rock in the manner illustrated in FIGURES 10 and 11. This plate is generally oval shaped and provides a shoulder 120 (FIGURE 14) extending around its periphery which functions as a track. A tensioning plate 122 of semi-circular shape fits into a slot in the righthand end of plate 118 to form a continuation of this track and is normally biased rightwardly as illustrated best in FIGURE 14 by means of springs 124 interposed between the plate 118 and the end tensioning plate. A pin 126 extends through this tensioning piece and maintains it in alignment with respect to the plate and limits the motion of the plate and the extension relative to each other. The conveyor itself generally indicated at 128 comprises a plurality of blocks 130 which are secured together on each side of the plate by links 140 and pins 142. The wires are gripped by the conveyor as best shown in FIGURE 15 by means of extensible clamping dogs 132 having slots 134 therein through which the pins 142 extend and by means of which the dogs are guided telescopically into and out of the block. Springs 136 which are received within recesses in the blocks 130 and the dogs 132 normally bias each one of the dogs toward the next block member 130 thereby to grip a wire between a recess 138 provided in the dog and the next adjacent block of the conveyor.

It will be apparent from FIGURES 10 and 11 that in use the operator positions a wire 139 over anvil 34 and as ram 28 descends a push down rod 162 forces the wire downwardly and between the dog and block which are disposed immediately therebelow. At the same time a terminal is crimped onto the wire end and then the conveyor travels clockwise as viewed in FIGURES 10 and 11 thereby to transport the wire to a position adjacent the injection molding station where the insulation is molded around the terminal. Thereafter it is carried around the curved portion of the track on block extension or plate extension 122 and as the links of the conveyor round the corners on this section, the separation between each dog and its adjacent block is increased and the lead is automatically released as shown in FIGURE 11.

Also illustrated in FIGURES 10 and 11 is a second pushdown rod 160 which is adapted to engage each of the blocks 130 during a portion of the operating cycle which encompasses the actual injection molding operation. In doing so this rod pivots plate 118 about its pivotal axes on the end of bracket 117 and thereby lowers the terminal into the mold cavities of the injection molding parts. The plate 118, however, is normally biased upwardly by means of a spring 115 received within a drilled opening in the plate and bearing against a fixed pin 116 which extends from the press frame through an elongated slot in the plate.

It is of course essential that the wire which has a terminal crimped thereto and around which the injection molding plastic is to be molded be precisely positioned relative to the molding dies and to this end there is provided an adjustable locator plate 121 (FIGURE 13) which, as the plate is rocked as illustrated in FIGURES 10 and 11, enters between adjacent links. As the plate 118 is rocked then, the conveyor itself may be displaced slightly one way or the other on its track 120 in order exactly to align the terminal with the mold cavity.

The means for indexing the conveyor during each operating cycle comprises a rod 148 having an adjustable finger 146 extending therefrom which is adapted to engage each of the blocks against a shoulder 144. Rod 148 is pivotally secured at its end to one end 150 of a lever 152 and is biased downwardly by means of a spring 151. Lever 152 is pivoted intermediate its ends at 154 to the press frame and has at its opposite end a cam follower 156 which is received with a cam 158 secured to rockable lever 12. A spring 153 normally biases lever 152 in the clockwise direction while a stop 155 is provided to limit its travel in this direction. Thus during movement of lever 12 in a clockwise direction, lever 152 is rotated in a clockwise direction about its pivot 154 thereby to retract rod 148 and finger 146 from the position of FIGURE 12 to the position of FIGURE 10. Upon reverse rocking (in the counterclockwise direction) of lever 12, lever 152 is also rotated in the counterclockwise direction thereby to advance the conveyor and to move the insulated terminal away from beneath the injector ram and to move an uninsulated terminal up to the injection molding station. It should be pointed out that follower 146 does not remain in the track in cam 158 during the entire cycle but leaves this track toward the end of the upward stroke of piston rod 8 and reenters it during the last portion of the downward stroke. With this arrangement, the retraction of feed finger 146 and its feeding stroke take place at the beginning and end of the cycle. The feed finger remains retracted during the intermediate portion of the cycle to permit the crimping operation as described below. As shown in FIGURES 10 and 11 the wires which have had terminals crimped thereto do not go directly from the crimping station to the molding station but dwell in a near intermediate position from a cycle of operation before they are delivered to the molding station. The primary purpose of this arrangement is to avoid unduly close spacing of the injection molding ram and the crimping ram.

In the preferred embodiment, there is provided means for automatically feeding terminals from a strip 160 to the crimping dies in the form of a pneumatic piston cylinder 162 having a piston rod 164 extending therefrom. A feed finger 166 pivotally connected to the end of the piston rod engages the strip and upon each leftward stroke as viewed in FIGURE 2, feeds the strip a distance substantially equal to the length of a terminal. The terminals are supplied from a reel mounted in a bracket 168 and the stroke of the feed finger is determined by a pair of co-acting stops 170, 172 to permit use of terminals of different lengths.

The control system for admitting air into double acting cylinder 4 and terminal feed cylinder 162 need not be specifically described since such controls are commonly known to the art. It is sufficient to say that the control system should be such that upon actuation thereof by a foot switch or the like, air is admitted into the lower end of cylinder 4 and a pressure is maintained on the lower side of the piston within this cylinder for about two seconds. During this period air is admitted to cylinder 162 to cause finger 166 to feed a terminal. The pressure is then released from the lower side of the cylinder and applied to the upper side as viewed in FIGURE 1 to cause return of the piston. It is apparent that a number of different types of switches and controls might be used to achieve the foregoing cycle. For example, good results can be achieved by means of a four-way solenoid valve controlled by an adjustable time delay relay to control the main cylinder. The terminal feed cylinder can be controlled by a three way valve with air timing.

It is also desirable to provide a safety switch to prevent initiation of a cycle unless the conveyer has been properly indexed from the previous cycle. To this end, a microswitch 168 is provided adjacent one end of the conveyor. This microswitch provides a spring arm 172 having a roller 174 on the end thereof which, when the conveyor is properly indexed for the start of a cycle, fits between the block and extensible dog of the conveyor which are disposed adjacent thereto. If the conveyor happens to be misaligned or if the track has not been properly indexed, this roller is contacted by the dog or block and the arm 172 is depressed to actuate the switch button. This microswitch is wired in with the main control circuit in any convenient manner such that the power supply is interrupted when the switch is actuated.

The operating cycle of the apparatus is as follows, assuming that the parts are in the position of FIGURE 1. The operator first actuates the air control switch to admit air into the lower end of the main cylinder and drive the piston upwardly. The lever is rocked in a clockwise direction and the two rams are driven downwardly. Ram 28 is driven past its dead center position while ram 42, upon which is mounted the molding plunger, is driven towards its bottom center position. This latter ram shears off a previously fed section of plastic and forces it downwardly into the lower portion of the bore in cylinder 44. As the frictional forces between the plastic and the cylinder increase, the cylinder itself is moved downwardly against the force of spring 58 until the mold is closed. During such movement, depressor 160 contacts the conveyor assembly and lowers it as shown in FIGURES 11 and 12 thereby to lower the terminal on a wire held by the conveyor into the mold. Thus, after the mold has been closed, the terminal will be positioned in the mold and upon further downward movement of the plunger, plastic is injected into the mold, around the crimped portion of the terminal and into the hollow nose portion of the terminal. The downward movement of the ram during this portion of the cycle, which in the illustrative embodiment may last about one to one and one half seconds, will be slight since the volume it must displace equals only the volume of the molding material injected.

During this injection molding operation a terminal is fed to the crimping station and the operator positions the stripped end of a wire above the terminal. At the conclusion of the molding operation, after about two seconds, air is exhausted from the lower end of the main cylinder and admitted into the upper end by the air control system previously described causing the lever to rock in a counterclockwise direction. Ram 28 again passes through its bottom dead center position thereby causing the wire held by the operator to be pushed into clamped engagement with the conveyor and at the same time its end is crimped onto a terminal. The plunger retracts during this interval causing the mold to open and during the final stages of the cycle, the conveyor is indexed and a terminal is fed to the crimping anvil.

The cycling time of the apparatus is determined largely by the molding operation and, even where only a small amount of plastic is injected, requires about two to two and one half seconds. A large portion of this cycling interval is required for the molding operation and during this portion the piston within cylinder 4 is being urged upwardly.

It will be apparent that ideally the amount of plastic fed into the bore of the molding cylinder should equal the amount of plastic injected into the mold for each cycle. As a practical matter this ideal balance is difficult to achieve. However, in the disclosed embodiment, the amount of plastic fed into the cylinder during a cycle is reduced if an excess of plastic remains from previous cycles. This reduction in the amount fed is achieved by virtue of the fact that if, at the beginning of a cycle, there is an excess of plastic in the cylinder, the ram 42 will not move downwardly as far as it otherwise would and plate 84 will not be moved downwardly by screw 90 as far as it would during a normal cycle. On the return stroke of the ram, the amount of plastic fed will be reduced since the total upward movement of the plate is reduced and the amount by which the feed wheel 78 is turned is also reduced.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A press comprising a lever pivotally mounted intermediate its ends, means for rocking said lever, a pair of links each pivotally connected to said lever adjacent one end thereof on separate pivotal axes, a pair of rams slidable along separate rectilinear paths towards and away from an operating zone, each of said rams being pivotally connected to one of said links, whereby upon movement of said lever in one direction about its pivotal axis, a first one of said rams moves through its bottom dead center position toward said operating zone and away from said operating zone, and the second one of said rams moves towards said operating zone, and upon movement of said lever in the opposite direction, said first ram moves through its bottom dead center position towards and away from said operating zone while said second ram moves away from said operating zone.

2. A press comprising a lever pivotally mounted intermediate its ends, a pair of links each pivotally connected to said lever adjacent one end thereof on separate pivotal axes, a first ram and a second ram slidable along separate rectilinear paths towards and away from an operating zone, each of said rams being pivotally connected to one of said links, and means for rocking said lever about its intermediate pivotal axis whereby said first ram passes its bottom dead center position twice, and said second ram approaches and moves away from its bottom dead center position during a single rocking of said lever.

3. A device as set forth in claim 2 wherein said first ram has a crimping die thereon, and said second ram has an injection molding plunger thereon.

4. A device as set forth in claim 3 including gripping and transfer means for gripping a wire and transferring said wire from a position adjacent said first ram to a position adjacent said second ram.

5. A press comprising a lever pivotally mounted intermediate its ends, a pair of links each pivotally connected to said lever adjacent one end thereof on separate pivotal axes, a first ram and a second ram slidable along separate rectilinear paths towards and away from an operating zone, a crimping die mounted on said first ram, an injection molding plunger mounted on said second ram, a pair of links pivotally secured to said lever on separate pivotal axes adjacent one end thereof, each of said links being pivotally secured to one of said rams, and means for rocking said lever about its pivotal axis whereby, said first ram moves through its bottom dead center position and said second ram moves towards its bottom dead center position when said lever is rocked in one direction, and said first ram again moves through its bottom dead center position and said second ram moves away from its bottom dead center position when said lever is rocked in the opposite direction.

6. A device as set forth in claim 5 including gripping and transfer means for gripping a wire and transferring said wire from a position adjacent said first ram to a position adjacent said second ram.

7. A device as set forth in claim 5 including a split mold disposed adjacent said second ram, and means actuated by said plunger for closing said mold as said lever is rocked.

8. A device as set forth in claim 7 including an injection molding cylinder, said plunger being reciprocable in said cylinder, and means for intermittently charging plastic molding material into said cylinder.

9. A device as set forth in claim 8 wherein said charging means comprises a feed wheel for feeding molding material in filamentary form into said cylinder, and means concatonated with said lever for actuating said feed wheel during movement of said plunger away from said mold.

10. Apparatus for crimping an electrical connector onto the end of a conductor and molding plastic insulating material around portions of said connector, said apparatus comprising, a lever pivotally mounted intermediate its ends, a pair of links each pivotally connected to said lever adjacent one end thereof on separate pivotal axes, a first ram and a second ram slidable along separate rectilinear paths towards and away from an operating zone, a crimping die mounted on said first ram and a molding plunger mounted on said second ram, a pair of links pivotally secured to said lever on separate pivotal axes adjacent one end thereof, each of said links being pivotally secured to one of said rams, a cylinder in surrounding relationship to said plunger and through which said plunger is reciprocable, said cylinder being moveable independently of said plunger in the directions of reciprocation of said plunger, a split separable mold, one section of said mold being secured to said cylinder and another section of said mold being fixed, means for normally biasing said cylinder and said one section in a direction away from said fixed section whereby, upon movement of said plunger against a charge of molding material in said cylinder, said molding material exerts a force on said cylinder thereby to move said cylinder and said one section of said mold towards said fixed section and close said mold, and upon further movement of said plunger, said molding material is injected into said mold, said apparatus including means for feeding filamentary molding material into said cylinder comprising a feed wheel actuated by an overrunning clutch, and abutment means on said second ram for actuating said clutch during the return stroke thereof.

References Cited in the file of this patent

UNITED STATES PATENTS

| | | |
|---|---|---|
| 1,321,829 | Kipness et al. | Nov. 18, 1919 |
| 1,321,830 | Kipness et al. | Nov. 18, 1919 |
| 1,702,229 | Moulton | Feb. 12, 1929 |
| 1,831,144 | Shearer | Nov. 10, 1931 |
| 2,841,824 | Harvey | July 8, 1958 |
| 2,871,516 | Sherman et al. | Feb. 3, 1959 |
| 2,914,804 | Gaspar et al. | Dec. 1, 1959 |
| 2,916,770 | Lemoine | Dec. 15, 1959 |

FOREIGN PATENTS

| | | |
|---|---|---|
| 605,150 | Great Britain | July 16, 1948 |